United States Patent
Ayadurai et al.

(10) Patent No.: US 12,126,553 B2
(45) Date of Patent: *Oct. 22, 2024

(54) TRANSMITTING AND RECEIVING PACKETS WIRELESSLY WITH TIME BASED PACKET DATA PORTION POSITIONING

(71) Applicant: Telefonaktiebolaget LM Ericsson (publ), Stockholm (SE)

(72) Inventors: Vicknesan Ayadurai, Sollentuna (SE); Divya Peddireddy, Gothenburg (SE); Luis Felipe Del Carpio Vega, Espoo (FI); Zaib Zubair, Exeter (GB); Eda Genc, Espoo (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/226,728

(22) Filed: Jul. 26, 2023

(65) Prior Publication Data

US 2023/0412331 A1  Dec. 21, 2023

Related U.S. Application Data

(63) Continuation of application No. 17/278,357, filed as application No. PCT/EP2018/075782 on Sep. 24, 2018, now Pat. No. 11,743,003.

(51) Int. Cl.
*H04L 5/00* (2006.01)
*H04W 84/12* (2009.01)

(52) U.S. Cl.
CPC ........... *H04L 5/0044* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,256,944 B1 | 4/2019 | Sun et al. | |
| 11,743,003 B2 * | 8/2023 | Ayadurai | H04L 69/325 370/329 |
| 2007/0076724 A1 | 4/2007 | Hall et al. | |
| 2007/0091886 A1 | 4/2007 | Davis et al. | |
| 2010/0189424 A1 | 7/2010 | Doehla et al. | |
| 2011/0252158 A1 | 10/2011 | Feng et al. | |

(Continued)

FOREIGN PATENT DOCUMENTS

| | | |
|---|---|---|
| EP | 2560453 A2 | 2/2013 |
| RU | 2117403 C1 | 8/1998 |
| WO | 9411975 A1 | 5/1994 |

(Continued)

*Primary Examiner* — Diane L Lo
(74) *Attorney, Agent, or Firm* — COATS & BENNETT, PLLC

(57) ABSTRACT

In one example aspect, a method of transmitting packets wirelessly is provided. The method comprises, for each packet, requesting to transmit the packet, waiting for a respective random or pseudorandom time period before transmitting the packet, and transmitting the packet containing a respective data portion, wherein a position of the respective data portion in the packet is selected such that a time interval between transmission of respective data portions in adjacent packets is a constant time interval.

25 Claims, 4 Drawing Sheets

(56) References Cited

U.S. PATENT DOCUMENTS

2014/0064212 A1  3/2014  Ko et al.
2019/0090255 A1  3/2019  Merlin

FOREIGN PATENT DOCUMENTS

WO      0048367 A2   8/2000
WO   2008120949 A1  10/2008
WO   2013044497 A1   4/2013

* cited by examiner

Receiving the packets at constant time intervals shifted by a respective random or pseudorandom time period, wherein a respective data portion in each of the packets is positioned in the packet such that a time interval between reception of respective data portions in adjacent packets is a constant time interval — 402

400

TRANSMITTING AND RECEIVING PACKETS WIRELESSLY WITH TIME BASED PACKET DATA PORTION POSITIONING

RELATED APPLICATIONS

The present application is a continuation of U.S. patent application Ser. No. 17/278,357, which was filed on Mar. 22, 2021, which is a national stage application of PCT/EP2018/075782, which was filed Sep. 24, 2018, the disclosures of each of which are incorporated herein by reference in their entirety.

TECHNICAL FIELD

Examples of the present disclosure relate to transmitting and receiving packets wirelessly, for example Wi-Fi packets.

BACKGROUND

Machinery in factories and other premises may be computer-controlled and operate in a distributed fashion. Due to strict demands in terms of reliability, robustness, and timings, communication between these different pieces of equipment is done over wired cables, which may in some cases carry Ethernet-type traffic. There are numerous Industrial Ethernet based protocols currently in place in today's manufacturing environments such as EtherCAT, PROFINET and IEEE 802.1 Time Sensitive Networking (TSN). Industrial systems may also use non-Ethernet based protocols such as PROFIBUS.

SUMMARY

One aspect of the present disclosure provides a method of transmitting packets wirelessly. The method comprises, for each packet, requesting to transmit the packet, and waiting for a respective random or pseudorandom time period before transmitting the packet. The method also comprises transmitting the packet containing a respective data portion, wherein a position of the respective data portion in the packet is selected such that a time interval between transmission of respective data portions in adjacent packets is a constant time interval.

Another aspect of the present disclosure provides a method of receiving packets wirelessly. The method comprises receiving the packets at constant time intervals shifted by a respective random or pseudorandom time period. A respective data portion in each of the packets is positioned in the packet such that a time interval between reception of respective data portions in adjacent packets is a constant time interval.

A further aspect of the present disclosure provides apparatus for transmitting packets wirelessly. The apparatus comprises a processor and a memory. The memory contains instructions executable by the processor such that the apparatus is operable to, for each packet, request to transmit the packet, wait for a respective random or pseudorandom time period before transmitting the packet, and transmit the packet containing a respective data portion, wherein a position of the respective data portion in the packet is selected such that a time interval between transmission of respective data portions in adjacent packets is a constant time interval.

A still further aspect of the present disclosure provides apparatus for receiving packets wirelessly. The apparatus comprises a processor and a memory. The memory contains instructions executable by the processor such that the apparatus is operable to receive the packets at constant time intervals shifted by a respective random or pseudorandom time period. A respective data portion in each of the packets is positioned in the packet such that a time interval between reception of respective data portions in adjacent packets is a constant time interval.

An additional aspect of the present disclosure provides apparatus for transmitting packets wirelessly. The apparatus is configured to request to transmit the packet, wait for a respective random or pseudorandom time period before transmitting the packet, and transmit the packet containing a respective data portion, wherein a position of the respective data portion in the packet is selected such that a time interval between transmission of respective data portions in adjacent packets is a constant time interval.

A further aspect of the present disclosure provides apparatus for receiving packets wirelessly. The apparatus is configured to receive the packets at constant time intervals shifted by a respective random or pseudorandom time period. A respective data portion in each of the packets is positioned in the packet such that a time interval between reception of respective data portions in adjacent packets is a constant time interval.

Another aspect of the present disclosure provides apparatus for transmitting packets wirelessly. The apparatus comprises a requesting module configured to request to transmit each packet, and a transmitting module configured to wait for a respective random or pseudorandom time period before transmitting each packet, and to transmit each packet containing a respective data portion, wherein a position of the respective data portion in the packet is selected such that a time interval between transmission of respective data portions in adjacent packets is a constant time interval.

Another aspect of the present disclosure provides apparatus for receiving packets wirelessly. The apparatus comprises a receiving module configured to receive the packets at constant time intervals shifted by a respective random or pseudorandom time period. A respective data portion in each of the packets is positioned in the packet such that a time interval between reception of respective data portions in adjacent packets is a constant time interval.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
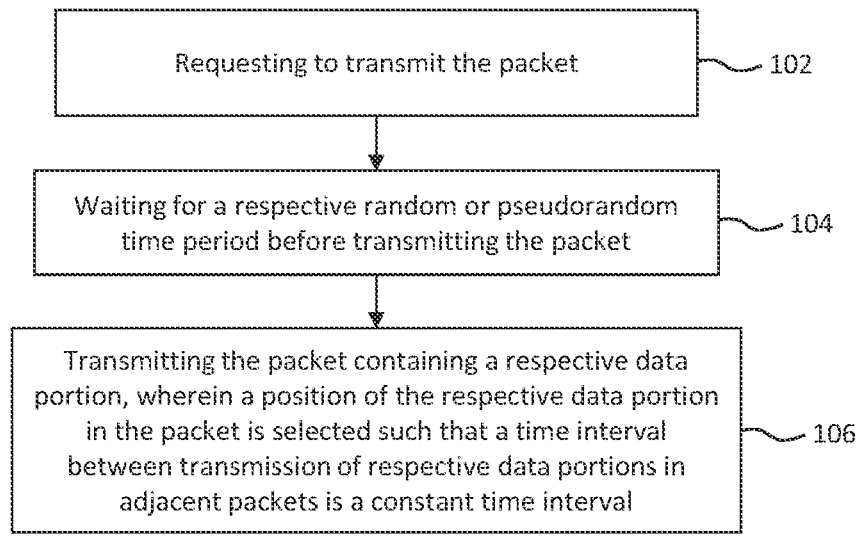
FIG. 1 is a flow chart of a method 100 of transmitting packets wirelessly.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Examples of industrial or factory automation systems may involve communications between two or more nodes. In the simplest case, two nodes operate as a master node and a slave node, such as for example a slave robot arm. The master and slave may operate within a control loop. For example, the master node may instruct the slave to move, and the slave node moves and in turn report its new position back to the master node. This cycle may repeat, and may involve exchange of data portions such as for example Industrial Ethernet data.

The master and slave nodes in some examples may exchange information in a periodic and predictable manner. The timing requirements for the control loop may be very tight and may be referred to as Critical Communications. If the master node doesn't receive information by a certain time indicating the position of a slave robot arm, for example, the robot arm may be stopped for safety reasons, which may lead to undesirable and costly production downtimes.

As a manufacturing process scales up, additional machinery may be added and more communications links may be introduced in the form of new cables between nodes such as controllers and machinery. However, wired communications links may require cables to be added or moved, adding to complexity and cost.

A wireless solution to replace these cables may solve one or more of the above problems. For example, wireless LANs, as described by the IEEE802.11 standards (henceforth referred to as "Wi-Fi") may be used. However, the underlying mechanisms used in this wireless standard may result in unpredictable data exchange times (e.g. when viewed on short timescales). A distributed manufacturing process may require data to be exchanged with tight timing requirements, and so Wi-Fi, with unpredictable data exchange times, may be unsuitable for such processes.

Wi-Fi specifies a Distributed Coordination Function (DCF) and a Hybrid Coordination Function (HCF) which dictate how devices contend for the common shared wireless medium when transmissions need to be made. One component of these functions is clear channel assessment (CCA), a mechanism implemented by each Wi-Fi transmitter to ensure the shared medium is free before attempting to transmit. The CCA algorithm, or alternatively carrier-sense multiple access with collision avoidance (CSMA/CA) or another random access procedure, may introduce an element of randomness for a device wishing to transmit, to try to ensure that no two transmitters will continually transmit simultaneously on the shared medium, resulting in perpetual interference with each other.

Embodiments of the present disclosure propose to use wireless communications, such as Wi-Fi for example, to exchange data in a manner so as to reduce or eliminate a variation in data exchange times.

FIG. 1 is a flow chart of a method 100 of transmitting packets wirelessly. The method 100 comprises, for each packet, in step 102, requesting to transmit the packet. The request may comprise for example sending a request to a communications module (e.g. software and/or hardware module) to send a wireless packet. Step 104 of the method 100 comprises waiting for a respective random or pseudorandom time period before transmitting the packet. The respective random or pseudorandom time period before transmitting the packet may be required for example by a communications module. The wait may in some examples be part of a random access procedure such as a Listen Before Talk (LBT) procedure or Contention Based Protocol (CBP), such as for example CCA or CSMA/CA. The random or pseudorandom waiting period may be required for every packet transmitted, or may be required when contention of the transmission medium is detected—e.g. another transmitter is transmitting at the time of the request (e.g. Carrier Sense Multiple Access, CSMA).

Step 106 of the method 100 comprises transmitting the packet containing a respective data portion, wherein a position of the respective data portion in the packet is selected such that a time interval between transmission of respective data portions in adjacent packets is a constant time interval. As a result, a receiver that receives the packets receives data portions within the packets at constant time intervals. In some examples, each packet includes a payload, and the position of the data portion within the payload is varied in each packet based on the respective pseudorandom time period so as to ensure that the data portions within adjacent packets are transmitted, and thus also received by a receiver, at constant time intervals.

Figure 2:
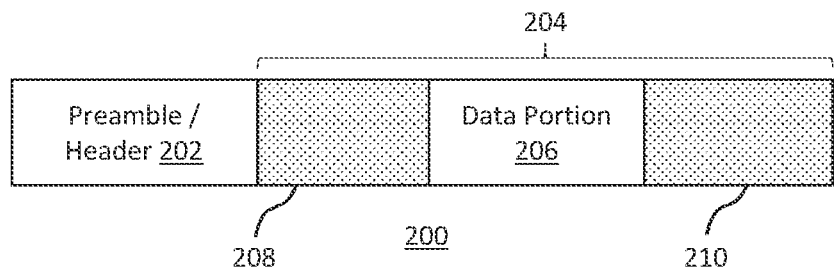
FIG. 2 shows an example of the structure of a packet.

FIG. 2 shows an example of the structure of a packet 200 such as a Wi-Fi packet. The packet 200 comprises a preamble and header portion 202 and a payload 204. The data portion 206 is a part of the payload 204. The size of the payload 204 (e.g. the amount of data in the payload) may be equal to or greater than the size of the data portion 206. The payload 204 may include data 208 preceding the data portion 206, and/or data 210 following the data portion 206. In some examples, the data 208 and/or the data 210 comprises padding data.

In some examples, the size or amount of data 208 preceding the data portion 206 for a packet to be transmitted may be varied based on the respective random or pseudorandom time period following a request to transmit the packet before transmission of the packet. For example, for a larger random or pseudorandom time period, the size of the data 208 may be smaller such that the interval between transmission of a previous data portion in a previous packet and transmission of the data portion 206 in the packet 200 is substantially constant between packets. Therefore, for example, there may be an inverse relationship (e.g. an inversely proportional relationship) between the amount of delay and the size of the data 208 preceding the data portion 206. In some examples, the size or amount of data 210 following the data portion 206 may be based on the random or pseudorandom time period. Alternatively, the size or amount of data 210 may be constant or zero, in which case the size of the packet 200 may also be based on the random or pseudorandom time period before transmission of the packet 200.

Figures 3, 4:
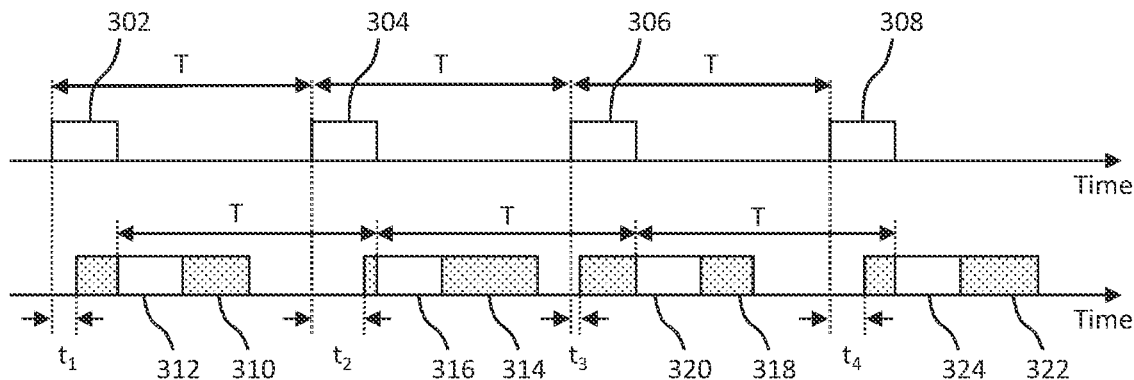
FIG. 3 is an example of a timing diagram of transmission of packets wirelessly.
FIG. 4 is a flow chart of an example of a method receiving packets wirelessly.

FIG. 3 is an example of a timing diagram of transmission of packets wirelessly. At substantially constant time intervals T, data portions 302, 304, 306 and 308 are made available to be transmitted to a receiver. For example, the time at which the start of adjacent data portions are made available may be separated by a substantially constant time interval T. The data portions may comprise for example control data to be sent from a controller to machinery, and/or feedback or sensor data to be sent from machinery to a controller. The data portions 302, 304, 306 and 308 may each be received at time intervals T for example in an Ethernet frame, or may each comprise an Ethernet frame. The data portions 302, 304, 306, 308 may be received for example over a wired Ethernet connection.

In the example shown in FIG. 3, a request to transmit a packet is made at the time of the start of the data portion (e.g. at the time of receipt of the start of the data portion). Considering first data portion 302, following a request to transmit a packet, a time delay t1 before transmission may be randomly or pseudorandomly selected. After the time delay t1, a packet 310 is transmitted wirelessly, containing a data portion 312. The data portion 312 may comprise, contain, encapsulate or otherwise represent the data portion 302. Hence, the data portion 312 in the packet 310 corresponds to the data portion 302. The position of the data portion 312 within the packet 310 (for example within the payload of the packet 310) may be selected based on the time period (time delay) t1. In some examples, the time period before a request to transmit is made may be included as part of the random or pseudorandom time period.

Similarly, a packet 314 is sent with a time delay of t2 containing a data portion 316 corresponding to data portion 304 following the start of the data portion 304 being made available (e.g. received); a packet 318 is sent with a time delay of t3 containing a data portion 320 corresponding to data portion 306; and a packet 322 is sent with a time delay of t4 containing a data portion 324 corresponding to data portion 308. The time delay between adjacent data portions 312, 316, 320 and 324 in adjacent packets 310, 314, 318, 322 (e.g. between the start of adjacent data portions) is a substantially a constant time period T due to the placement of each data portion within the respective packet. Thus, a receiver may receive each data portion 312, 316, 320 and 324 at substantially constant time intervals T, which may correspond to substantially constant time intervals T of the data portions 302, 304, 306 and 308.

In some examples, a request to transmit the packet is made in response to receiving at least part of a data portion (e.g. one of data portions 302, 304, 306, 308). However, in other examples, the data portions are received at regular intervals, e.g. at a substantially constant time interval T between the start of receipt of each data portion 302, 304, 306, 308. Therefore, a request to transmit a packet can in some examples be made before any part of a data portion 302, 304, 306, 308 is received, in anticipation or expectation of receipt of a data portion 302, 304, 306, 308. Thus, the method 100 may comprise requesting to transmit the packet before receiving at least part of the data portion 302, 304, 306, 308.

In some examples, the position of the respective data portion in the packet comprises a predetermined position in the payload shifted by the respective random or pseudorandom time period. For example, if a request to transmit a packet is made at substantially regular or substantially constant time intervals, and a random or pseudorandom time delay t before transmission of a packet is specified, then the position of the data portion in the packet (e.g. within the payload) may be shifted from a predetermined position by an amount equivalent to −t, for example, to compensate for the delay specified for that packet. In other words, for example, where the random or pseudorandom delay is non-zero, the position of the data portion may be shifted earlier in time (relative to the time of start of transmission of the packet, for example, which follows the random or pseudorandom delay) by the same amount.

FIG. 4 is a flow chart of an example of a method 400 receiving packets wirelessly, such as for example Wi-Fi packets. The method 400 comprises, in step 402, receiving the packets at constant time intervals shifted by a respective random or pseudorandom time period, wherein a respective data portion in each of the packets is positioned in the packet such that a time interval between reception of respective data portions in adjacent packets is a constant time interval. That is, for example, each packet is shifted in time from a constant time interval by a random or pseudorandom amount specific to that packet, and the position of the data portion within a packet (e.g. within a payload of the packet) may also be shifted to compensate for the random or pseudorandom amount for that packet. In other words, for example, where the random or pseudorandom time period is non-zero, the position of the received data portion may have been shifted earlier in time (relative to the time of start of transmission or reception of the packet, for example, which follows the random or pseudorandom time period) by the same amount.

Each packet may have the structure of the packet 200 shown in FIG. 2. Examples of received packets may include the packets 310, 314, 318 and 322 shown in FIG. 3. Therefore, for example, received packets may include data in the payload (e.g. data 208 preceding the data portion 206 as shown in FIG. 3) to ensure that the position of the data portion causes each data portion to be received at substantially constant time intervals. The data 208 may in some examples be padding data. In some examples, the payload 204 may also include further data 210, such as padding data, following the data portion 206. The size of the data 208 and/or the data 210 may be dependent on, for example, a random or pseudorandom time delay following a request to transmit the packet 204 before the packet 204 is transmitted.

In some examples, the data portion is extracted from each received packet and forwarded, for example to a master node or a slave node. Thus data portion may be forwarded (and hence for example received by the master or slave node) at substantially regular or substantially constant time intervals. In some examples, the data portion is extracted and forwarded immediately upon receipt of each packet or following a predetermined time period. In some examples, the data portion is sent (e.g. to a master or slave node) without the padding data in an Ethernet frame.

Particular examples of embodiments will now be described. If it is assumed that latency as data traverses a physical Ethernet cable is negligible, data transmitted across a wired Ethernet connection will arrive at the receiver immediately. Therefore, the timing, or periodicity, of a data stream (e.g. a stream of data portions) may be identical at both a sender node and a receiver node. For example, the periodicity (e.g. the time interval between start of sending adjacent data portions) is T. To achieve wireless communications, the wired Ethernet cable can in some examples be replaced by connecting both the sender node (e.g. Programmable Logic Controller, PLC) and the receiver node (e.g. a robot arm) each to a respective Wi-Fi device, for example via a respective wired Ethernet connection. The timings of data portions received at the Wi-Fi device of the sender node is maintained. In some examples, the bits of each packet (e.g. data portion, or containing the data portion) received on the wired interface are buffered, and once the entire packet has been received on the wired interface, it can be transmitted wirelessly, for example as a Wi-Fi packet.

If the sender Wi-Fi device transmits received data portions immediately upon receipt, then the wireless transmissions will be shifted right by a fixed time period, e.g. the packet-length duration, but will still have a periodicity of T and thus will also have a periodicity of T when eventually arriving at the receiver node. However, in practice, the wireless transmissions may be subjected to a random access process such as for example CCA or CSMA/CA. This may result in different (e.g. random or pseudorandom) delays for each wireless transmission, such as each transmitted packet.

Therefore, the time between consecutive packets transmitted over the air (e.g. the time between the start of transmission of consecutive packets) may no longer be the constant time interval T. Instead, the time between these wireless transmissions are now subject to the random access process. Since the time delay before transmitting each packet, following a requests to transmit each packet, are potentially different for each packet due to the random access process, this may introduce variance or jitter in the timing of the traffic stream, which will propagate through the network and be eventually observed at the receiver node. For industrial automation scenarios, this jitter could have adverse effects on the operation of devices. Hence, embodiments of this disclosure provide a mechanism to ensure that important data, e.g. each data portion, is transmitted at substantially constant time intervals.

Embodiments of this disclosure may overcome this jitter by exploiting two characteristics of typical Industrial Ethernet traffic: data portions or packets are of relatively small size, and the traffic patterns are relatively constant, e.g. periodic. That is, for example, data portions may be provided for transmission in a substantially periodic manner. Because the industrial Ethernet data portion is small for example, it can be encapsulated or incorporated within a larger 1500-byte packet. Transmission time for a 1500-byte packet over a Wi-Fi 802.11n system with Modulation and Coding Scheme (MCS) 0 may in some examples take approximately 2000 µs. If an Industrial Ethernet data portion is smaller than 1500-bytes, then a 1500-byte packet or frame can be generated and filled with padding bytes, and the smaller data portion can be inserted within the 1500-byte packet or frame. By placing the data portion somewhere within the larger packet or frame, the time the data portion itself will be transmitted, and hence seen at the receiver, can be varied within an approximately 2000 µs window.

Example embodiments may exploit the predictability of the Industrial Ethernet traffic stream. The Wi-Fi device of the sending node may initiate the random access process for a wireless transmission in anticipation of a received wired packet. The wireless transmitter may then be granted the right to transmit over the air early, potentially even before it has received the data portion to transmit. In this situation, the wireless node can begin transmitting padding data in a transmitted packet (e.g. in its payload) until the data portion has been received (e.g. over the wired Ethernet interface from the sending node). At this point, transmission of the packet can continue, but with the data portion being transmitted as part of the transmitted packet.

Since in some examples the packet length is indicated at the start of the transmission, the transmitter (e.g. Wi-Fi device connected to the sending node) may specify an oversized transmission of up to 1500-bytes at the start of the transmission (e.g. in the packet header), and hence may need to fill the end of the packet (e.g. the portion of the payload following the data portion) with padding data.

At the other end of the radio link, in some examples, the wireless receiver will receive each 1500-byte packet but will be able to detect and discard the padding data. Thus, the receiver, e.g. the Wi-Fi device connected to the receiving node, may forward only the data portion to the receiving node. The timing of the data portions sent on the wired interface of the receiving node will have a periodicity of T. Thus, for example, the timings for the transmitted packets are still subjected to jitter, introduced by the random access process. However, the data portion part of the transmitted packets have a periodicity of T, just as in the original Ethernet-received stream.

Some example embodiments of this disclosure may be implemented as a software module as part of an existing Wi-Fi 802.11 entity or device, such as for example an Access Point (AP) or Station (STA). The device may be configured to be able to identify the Industrial Ethernet traffic stream, e.g. based on source and/or destination addresses for example, and also to know periodicity of this traffic and possibly also the size of each data portion in this traffic. The device may also know the identity or destination address of the corresponding Wi-Fi entity at the other end of the wireless link.

Whenever receiving a data portion (e.g. packet or frame) on the wired interface, the device may in some examples initiate the random access procedure (e.g. by requesting to transmit a packet wirelessly), and also generate a 1500-byte packet with padding data. After a random or pseudorandom time delay due to the random access process, the device may place the data portion within the 1500-byte packet at an appropriate point, e.g. to compensate for the random or pseudorandom time delay, and transmit the packet wirelessly. When a receiving Wi-Fi device receives a wireless packet, it may look for padding data in the packet. The padding data in the received packet may be removed or discarded, and when the data portion is received it may be transmitted over a wired interface, e.g. to a receiving node.

In some example embodiments, a transmitter periodically initiates the random access process, as well as generates a 1500-byte packet containing padding data, which is then queued for transmission. When channel access is granted, the packet is transmitted wirelessly. A data portion should arrive (e.g. in a packet or frame) over a wired Ethernet interface, as anticipated or predicted for example, and is merged into the packet being transmitted such that the data portion is located in the appropriate position within the larger 1500-byte packet. An example sequence of events for a transmitter is as follows:

i. Prior to arrival of an Ethernet packet or frame, a random access request (e.g. CCA request) is made (e.g. a request to transmit a packet is made), and a 1500-byte packet containing padding data is generated, which is placed in a queue.

ii. When the random access process indicates the channel is clear (e.g. after a random or pseudorandom time period after the request), the packet containing padding data begins to transmit.

iii. As the packet is being transmitted, a data portion is expected to arrive via the wired Ethernet interface, and is placed in a second queue.

iv. Based on timing, such as for example the random or pseudorandom time period, the data being transmitted switches from the first queue (padding data) to the second queue (data portion).

iv. Once all of the data portion has been transmitted, transmission switches back to the first queue until a sufficient number of combined bytes have been transmitted, as indicated at the start of the transmission (e.g. length of packet).

In some examples, a receiver of wireless packets may filter incoming wireless packets, and based on preconfigured information, e.g., MAC source and/or destination addresses, can process the frame accordingly to remove padding octets found. An example of a sequence of events implemented by a receiver is as follows:

i. Incoming wireless packets are scanned for padding data.
ii. Packets with no padding data are transmitted directly out the wired Ethernet interface (e.g. as Ethernet frames).
iii. Packets with padding data are queued and the padding bytes discarded until data bytes are detected.
iv. The data portion is then transmitted from the wired interface until more padding bytes are detected, which are also discarded.

Figure 5:
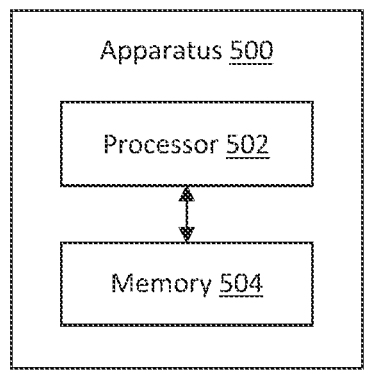
FIG. 5 is a schematic of an example of apparatus for transmitting packets wirelessly.

FIG. 5 is a schematic of an example of apparatus 500 for transmitting packets wirelessly. The apparatus 500 comprises a processor 502 and a memory 504. The memory 504 contains instructions executable by the processor 502 such that the apparatus 500 is operable to, for each packet, request to transmit the packet, wait for a respective random or pseudorandom time period before transmitting the packet, and transmit the packet containing a respective data portion, wherein a position of the respective data portion in the packet is selected such that a time interval between transmission of respective data portions in adjacent packets is a constant time interval. In some examples, the apparatus 500 may implement the method 100 shown in FIG. 1.

Figure 6:
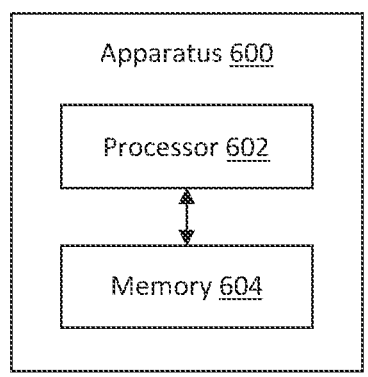
FIG. 6 is a schematic of an example of apparatus for receiving packets wirelessly.

FIG. 6 is a schematic of an example of apparatus 600 for receiving packets wirelessly. The apparatus 600 comprises a processor 602 and a memory 604. The memory 604 contains instructions executable by the processor 602 such that the apparatus 600 is operable to receive the packets at constant time intervals shifted by a respective random or pseudorandom time period, wherein a respective data portion in each of the packets is positioned in the packet such that a time interval between reception of respective data portions in adjacent packets is a constant time interval. In some examples, the apparatus 600 may implement the method 400 shown in FIG. 4.

Figure 7:
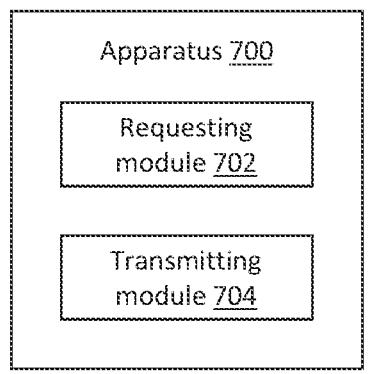
FIG. 7 is a schematic of an example of apparatus for transmitting packets wirelessly.

FIG. 7 is a schematic of an example of apparatus 700 for transmitting packets wirelessly. The apparatus 700 comprises a requesting module 702 configured to request to transmit each packet, and a transmitting module 704 configured to wait for a respective random or pseudorandom time period before transmitting each packet, and to transmit each packet containing a respective data portion, wherein a position of the respective data portion in the packet is selected such that a time interval between transmission of respective data portions in adjacent packets is a constant time interval. In some examples, the apparatus 700 may implement the method 100 shown in FIG. 1.

Figure 8:
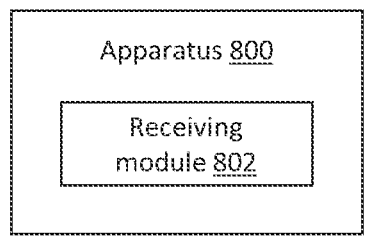
FIG. 8 is a schematic of an example of apparatus for receiving packets wirelessly.

FIG. 8 is a schematic of an example of apparatus 800 for receiving packets wirelessly. The apparatus 800 comprises a receiving module 802 configured to receive the packets at constant time intervals shifted by a respective random or pseudorandom time period, wherein a respective data portion in each of the packets is positioned in the packet such that a time interval between reception of respective data portions in adjacent packets is a constant time interval. In some examples, the apparatus 800 may implement the method 400 shown in FIG. 4.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

What is claims is:

1. A method of transmitting packets wirelessly, the method comprising, for each packet:
   requesting to transmit the packet;
   waiting for a respective random or pseudorandom time period before transmitting the packet; and
   transmitting the packet containing a respective data portion, wherein a position within the packet is selected for the respective data portion such that a time interval between transmission of respective data portions in adjacent packets is a constant time interval.

2. The method of claim 1, further comprising receiving the respective data portion, wherein the requesting to transmit the packet comprises requesting to transmit the packet in response to receiving at least part of the data portion.

3. The method of claim 1, further comprising receiving the data portion; wherein requesting to transmit the packet comprises requesting to transmit the packet before receiving at least part of the data portion.

4. The method of claim 1, wherein the data portion is received in an Ethernet frame.

5. The method of claim 1, wherein a respective size of a portion of padding data preceding the data portion is based on the respective random or pseudorandom time period.

6. The method of claim 1, wherein a payload comprises a portion of padding data following the respective data portion.

7. The method of claim 1, wherein a payload of the packet comprises a payload of an Ethernet frame.

8. The method of claim 1, wherein a size of a payload of the packet is greater than a size of the respective data portion.

9. The method of claim 1, wherein the position of the respective data portion in the packet comprises a predetermined position in a payload shifted by the respective random or pseudorandom time period.

10. The method of claim 1, further comprising receiving, in response to the request to transmit the packet, an indication of the respective random or pseudorandom time period.

11. The method of claim 1, wherein the requesting to transmit the packet comprises requesting to transmit each packet at constant time intervals.

12. The method of claim 1, further comprising requesting to transmit the packet in anticipation of receipt of the respective data portion.

13. An apparatus for transmitting packets wirelessly, the apparatus comprising:
   processing circuitry;
   memory containing instructions executable by the processing circuitry whereby the apparatus is operative to, for each packet:
      request to transmit the packet;
      wait for a respective random or pseudorandom time period before transmitting the packet; and
      transmit the packet containing a respective data portion, wherein a position within the packet is selected for the respective data portion such that a time interval between transmission of respective data portions in adjacent packets is a constant time interval.

14. The apparatus of claim 13, further operative to receive the respective data portion, wherein the request to transmit the packet comprises requesting to transmit the packet in response to receiving at least part of the data portion.

15. The apparatus of claim 13, further operative to receive the data portion; wherein requesting to transmit the packet comprises requesting to transmit the packet before receiving at least part of the data portion.

16. The apparatus of claim 13, wherein the data portion is received in an Ethernet frame.

17. The apparatus of claim 13, wherein a respective size of a portion of padding data preceding the data portion is based on the respective random or pseudorandom time period.

18. The apparatus of claim 13, wherein a payload comprises a portion of padding data following the respective data portion.

19. The apparatus of claim 13, wherein a payload of the packet comprises a payload of an Ethernet frame.

20. The apparatus of claim 13, wherein a size of a payload of the packet is greater than a size of the respective data portion.

21. The apparatus of claim 13, wherein the position of the respective data portion in the packet comprises a predetermined position in a payload shifted by the respective random or pseudorandom time period.

22. The apparatus of claim 13, further operative to receive, in response to the request to transmit the packet, an indication of the respective random or pseudorandom time period.

23. The apparatus of claim 13, wherein the request to transmit the packet comprises a request to transmit each packet at constant time intervals.

24. The apparatus of claim 13, further operative to request to transmit the packet in anticipation of receipt of the respective data portion.

25. A system comprising:
   a transmitting apparatus operative to, for each of a plurality of packets:
      request to transmit the packet;
      wait for a respective random or pseudorandom time period before transmitting the packet; and
      wirelessly transmit the packet, the packet containing a respective data portion at a position in the packet selected such that a time interval between transmission of respective data portions in adjacent packets is a constant time interval;
   a receiving apparatus operative to wirelessly receive the packets at constant time intervals shifted by the respective random or pseudorandom time period.

* * * * *